United States Patent
Squires

(10) Patent No.: US 6,505,378 B1
(45) Date of Patent: Jan. 14, 2003

(54) WIPER ASSEMBLY

(76) Inventor: James W. Squires, 1700 Chateau Dr., Green Bay, WI (US) 54304

( * ) Notice: Subject to any disclaimer, the term of this patent is extended or adjusted under 35 U.S.C. 154(b) by 39 days.

(21) Appl. No.: 09/822,516

(22) Filed: Mar. 30, 2001

(51) Int. Cl.[7] .............................. B60S 1/04; B60S 1/28; B60S 1/38
(52) U.S. Cl. .................... 15/250.41; 15/250.4
(58) Field of Search ..................... 15/250.4, 250.41, 15/250.361, 250.48

(56) References Cited

U.S. PATENT DOCUMENTS

| | | | |
|---|---|---|---|
| 3,631,561 A | * 1/1972 | Aszkenas | ................... 15/250.4 |
| 3,906,583 A | 9/1975 | Murphy | |
| 4,567,621 A | 2/1986 | Alley | |
| 4,649,593 A | 3/1987 | Gilliam | |
| 5,235,720 A | 8/1993 | Kinder | |
| 5,301,384 A | * 4/1994 | Perry | ........................ 15/250.4 |
| D349,082 S | 7/1994 | Brabender | |
| 5,406,672 A | 4/1995 | Hipke | |
| 5,442,834 A | * 8/1995 | Perry | ........................ 15/254.4 |
| 6,279,193 B1 | * 8/2001 | Cheng | .................... 15/250.41 |

FOREIGN PATENT DOCUMENTS

| | | | | |
|---|---|---|---|---|
| DE | 2412408 | * | 9/1975 | ................ 15/250.4 |
| DE | 2619633 | * | 11/1977 | ............. 15/250.41 |
| FR | 2000224 | * | 8/1969 | ................ 15/250.4 |
| GB | 2132077 | * | 7/1984 | ............. 15/250.41 |

* cited by examiner

Primary Examiner—Gary K. Graham

(57) ABSTRACT

A wiper assembly for providing additional scrubbing surface area. The wiper assembly includes a wiper blade designed for coupling to a wiper arm of a vehicle and including an articulation, a blade which is comprised of an elastomeric material and is positionable in a groove in the wiper blade, a scrubbing member which is couplable to the wiper blade for removing debris from the windshield, and a plurality of clip members for coupling the scrubbing member to the wiper blade.

4 Claims, 2 Drawing Sheets

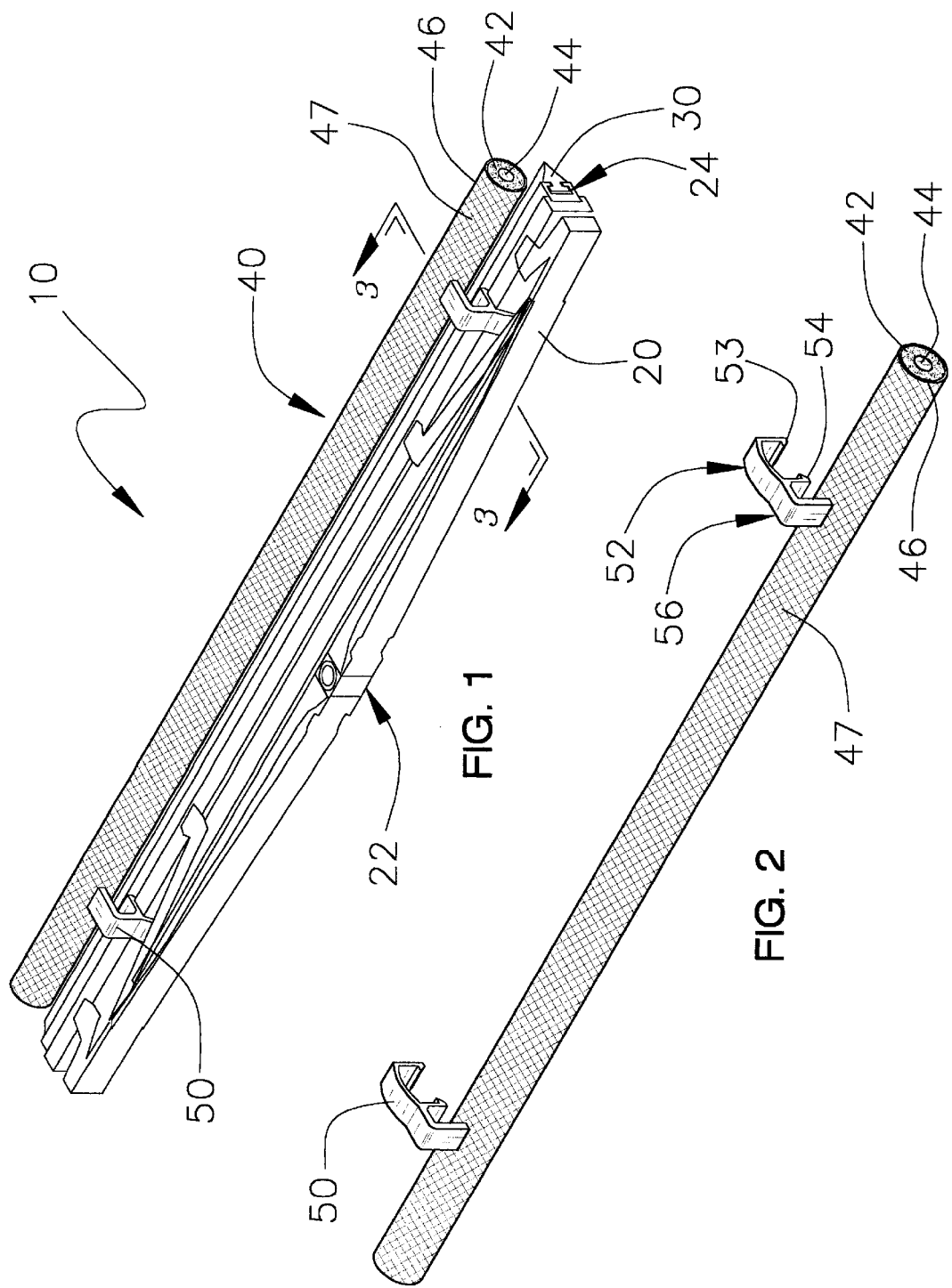

WIPER ASSEMBLY

BACKGROUND OF THE INVENTION

1. Field of the Invention

The present invention relates to wiper blades and more particularly pertains to a new wiper assembly for providing additional scrubbing surface area.

2. Description of the Prior Art

The use of wiper blades is known in the prior art. More specifically, wiper blades heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,406,672; U.S. Pat. No. 3,906,583; U.S. Pat. No. 5,235,720; U.S. Pat. No. 4,567,621; U.S. Pat. No. 4,649,593; and U.S. Pat. No. Des. 349,082.

While these devices fulfill their respective, particular objectives and requirements, the aforementioned patents do not disclose a new wiper assembly. The inventive device includes a wiper blade designed for coupling to a wiper arm of a vehicle and including an articulation, a blade which is comprised of an elastomeric material and is positionable in a groove in the wiper blade, a scrubbing member which is couplable to the wiper blade for removing debris from the windshield, and a plurality of clip members for coupling the scrubbing member to the wiper blade.

In these respects, the wiper assembly according to the present invention substantially departs from the conventional concepts and designs of the prior art, and in so doing provides an apparatus primarily developed for the purpose of providing additional scrubbing surface area.

SUMMARY OF THE INVENTION

In view of the foregoing disadvantages inherent in the known types of wiper blades now present in the prior art, the present invention provides a new wiper assembly construction wherein the same can be utilized for providing additional scrubbing surface area.

The general purpose of the present invention, which will be described subsequently in greater detail, is to provide a new wiper assembly apparatus and method which has many of the advantages of the wiper blades mentioned heretofore and many novel features that result in a new wiper assembly which is not anticipated, rendered obvious, suggested, or even implied by any of the prior art wiper blades, either alone or in any combination thereof.

To attain this, the present invention generally comprises includes a wiper blade designed for coupling to a wiper arm of a vehicle and including an articulation, a blade which is comprised of an elastomeric material and is positionable in a groove in the wiper blade, a scrubbing member which is couplable to the wiper blade for removing debris from the windshield, and a plurality of clip members for coupling the scrubbing member to the wiper blade.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wiper assembly apparatus and method which has many of the advantages of the wiper blades mentioned heretofore and many novel features that result in a new wiper assembly which is not anticipated, rendered obvious, suggested, or even implied by any of the prior art wiper blades, either alone or in any combination thereof.

It is another object of the present invention to provide a new wiper assembly which may be easily and efficiently manufactured and marketed.

It is a further object of the present invention to provide a new wiper assembly which is of a durable and reliable construction.

An even further object of the present invention is to provide a new wiper assembly which is susceptible of a low cost of manufacture with regard to both materials and labor, and which accordingly is then susceptible of low prices of sale to the consuming public, thereby making such wiper assembly economically available to the buying public.

Still yet another object of the present invention is to provide a new wiper assembly which provides in the apparatuses and methods of the prior art some of the advantages thereof, while simultaneously overcoming some of the disadvantages normally associated therewith.

Still another object of the present invention is to provide a new wiper assembly for providing additional scrubbing surface area.

Yet another object of the present invention is to provide a new wiper assembly which includes a wiper blade designed for coupling to a wiper arm of a vehicle and including an articulation, a blade which is comprised of an elastomeric material and is positionable in a groove in the wiper blade, a scrubbing member which is couplable to the wiper blade for removing debris from the windshield, and a plurality of clip members for coupling the scrubbing member to the wiper blade.

Still yet another object of the present invention is to provide a new wiper assembly that can be retrofit onto any vehicle.

Even still another object of the present invention is to provide a new wiper assembly that improves safety by providing improved visibility.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new wiper assembly according to the present invention.

FIG. 2 is a schematic detail view of the scrubber member and clip members of the present invention.

DESCRIPTION OF THE PREFERRED EMBODIMENT

Figure 3:
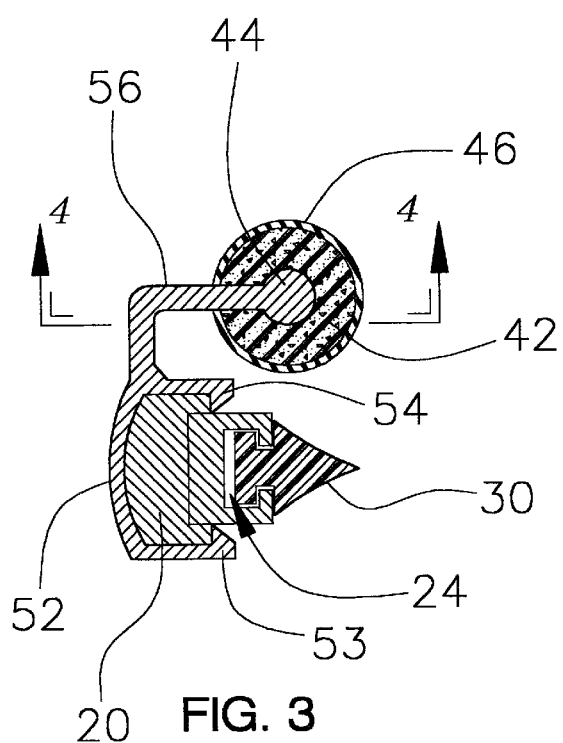
FIG. 3 is a schematic cross-sectional view of the present invention taken along line 3—3 of FIG. 1.
Figure 4:
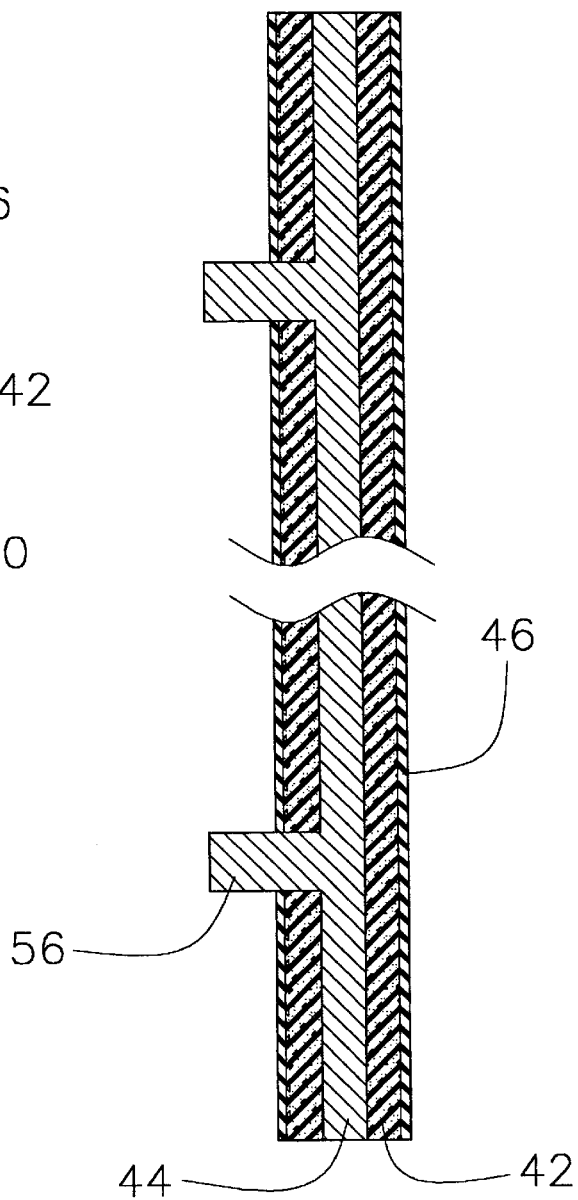
FIG. 4 is a schematic cross-sectional view of the present invention taken along line 4—4 of FIG. 3.

With reference now to the drawings, and in particular to FIGS. 1 through 4 thereof, a new wiper assembly embodying the principles and concepts of the present invention and generally designated by the reference numeral 10 will be described.

As best illustrated in FIGS. 1 through 4, the wiper assembly 10 generally comprises a wiper blade 20, a blade 30, a scrubbing member 40, and a plurality of clip members 50.

The wiper blade 20 is designed for coupling to a wiper arm of a vehicle. The wiper blade 20 includes an articulation 22.

The blade 30 is comprised of an elastomeric material. The blade 30 is positionable in a groove 24 in the wiper blade 30. The blade 30 is for moving water off of a windshield of a vehicle.

The scrubbing member 40 is couplable to the wiper blade 20. The scrubbing member 40 is for removing debris from the windshield.

The plurality of clip members 50 are used for coupling the scrubbing member 40 to the wiper blade 20.

The scrubbing member 40 further comprises a sponge portion 42, a central core portion 44, and a covering portion 46. The sponge portion 42 is used for absorbing and distributing water from the windshield. The central core portion 44 is resiliently flexible. The central core portion 44 provides rigidity to the scrubbing member 40. The covering portion 46 has a lattice of cross-members 47. The lattice of cross members 47 is substantially intertwined such that the covering portion 46 resembles netting. The covering portion 46 provides a slight abrasive characteristic for facilitating the removal of debris such as the remains of dead bugs.

Each of the plurality of clip members 50 further comprises a first coupling portion 52 and a second coupling portion 56. The first coupling portion 52 is substantially u-shaped. The first coupling portion 52 has a first 53 and second tab 54 for securing the clip member 50 to the wiper blade 20. The second coupling portion 56 is used for securing the scrubbing member 40. The second coupling portion 56 is positioned adjacent to the first coupling portion 52 such that the clip member 50 has a cross-section which is substantially m-shaped.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wiper assembly comprising:
    a blade support adapted for coupling to a wiper arm of a vehicle, said blade support having an articulation;
    a blade comprised of an elastomeric material, said blade being positionable in a groove in said blade support, said blade being for moving water off of a windshield of a vehicle;
    a scrubbing member couplable to said blade support, said scrubbing member being for removing debris from the windshield;
    said scrubbing member having a sponge portion for absorbing and distributing water from the windshield;
    said scrubbing member having a covering portion, said covering portion being a lattice of cross-members, said lattice of cross members being substantially intertwined such that said covering portion resembles netting, said covering portion providing a slight abrasive characteristic for facilitating the removal of debris such as the remains of dead bugs;
    said scrubbing member having a central core member, said central core member being resiliently flexible, said central core member providing rigidity to said sponge portion, said central core member positioned being position through a longitudinal axis of said sponge portion; and
    a plurality of clip members for coupling said scrubbing member to said blade support, said clip members extending from said central core member.

2. The wiper assembly of claim 1, wherein said central core member comprising metal.

3. The wiper assembly of claim 1, wherein each of said plurality of clip members further comprises:
    a first coupling portion for coupling to said blade support, said first coupling portion being substantially u-shaped, said first coupling portion having a first and second tab for securing said clip member to said blade support; and a second coupling portion for securing said scrubbing member, said second coupling portion being positioned adjacent to said first coupling portion such that said clip member has a cross-section which is substantially m-shaped.

4. A wiper assembly comprising:

a blade support adapted for coupling to a wiper arm of a vehicle, said blade support having an articulation;

a blade comprised of an elastomeric material, said blade being positionable in a groove in said blade support, said blade being for moving water off of a windshield of a vehicle;

a scrubbing member couplable to said blade support, said scrubbing member being for removing debris from the windshield;

a plurality of clip members for coupling said scrubbing member to said blade support;

said scrubbing member further comprises:

a sponge portion for absorbing and distributing water from the windshield;

a central core member, said central core member being resiliently flexible, said central core member providing rigidity to said sponge portion;

a covering portion, said covering portion having a lattice of cross-members, said lattice of cross members being substantially intertwined such that said covering portion resembles netting, said covering portion providing a slight abrasive characteristic for facilitating the removal of debris such as the remains of dead bugs;

each of said plurality of clip members further comprises:

a first coupling portion for coupling to said blade support, said first coupling portion being substantially u-shaped, said first coupling portion having a first and second tab for securing said clip member to said blade support; and a second coupling portion extending from said central core member for securing said scrubbing member, said second coupling portion being positioned adjacent to said first coupling portion such that said clip member has a cross-section which is substantially m-shaped.

* * * * *